United States Patent
Izumiya (12)

(10) Patent No.: US 6,404,449 B1
(45) Date of Patent: Jun. 11, 2002

(54) COLOR IMAGE FORMING APPARATUS PERFORMING AN EXPOSURE SCANNING OPERATION ONTO A PHOTORECEPTOR BY MEANS OF A LASER BEAM REFLECTED BY A ROTATING MIRROR

(75) Inventor: Kenji Izumiya, Tokyo (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/666,691

(22) Filed: Sep. 20, 2000

(30) Foreign Application Priority Data

Sep. 22, 1999 (JP) .......................................... 11-268810

(51) Int. Cl.[7] .......................... G03C 15/01; H04N 1/00; G02B 26/10
(52) U.S. Cl. ........................................ 347/116; 347/234
(58) Field of Search ................................ 347/116, 234, 347/235, 248, 249, 250; 399/299, 301

(56) References Cited

U.S. PATENT DOCUMENTS 6,128,459 A * 10/2000 Iwata et al. .................. 399/301

FOREIGN PATENT DOCUMENTS

JP 11-218696 * 8/1999

* cited by examiner

*Primary Examiner*—Joan Pendegrass
(74) *Attorney, Agent, or Firm*—Frishauf, Holtz, Goodman, Langer & Chick, P.C.

(57) ABSTRACT

A color image forming apparatus includes a photoreceptor and a plurality of exposure-scanning sections, one of which outputs a reference horizontal-sync. signal. The color image forming apparatus also includes a synchronizing section to synchronize a horizontal-sync. signal, output by another exposure-scanning section, with the reference horizontal-sync. signal, and to synchronize an image tip signal with the reference horizontal-sync. signal. The color image forming apparatus also includes an adjusting section to adjust a commencement of the exposure-scanning operation performed by each of the exposure-scanning sections, based on the reference horizontal-sync. signal output by one of the exposure-scanning sections, and a positional deviation detecting section to detect a positional deviation on the basis of a plurality of marks formed on said photoreceptor by the plurality of exposure-scanning sections.

4 Claims, 8 Drawing Sheets

COLOR IMAGE FORMING APPARATUS PERFORMING AN EXPOSURE SCANNING OPERATION ONTO A PHOTORECEPTOR BY MEANS OF A LASER BEAM REFLECTED BY A ROTATING MIRROR

BACKGROUND OF THE INVENTION

The present invention relates to a color image forming apparatus equipped with a plurality of exposure-scanning units, each of which performs an exposure-scanning operation onto a photoreceptor by means of a laser beam reflected by a rotating mirror, and specifically relates to a method of controlling the abovementioned exposure-scanning operation.

For instance, in a color image forming apparatus employing an electro-photographic method, a full color image is formed by sequentially overlapping a plurality of unicolor images. For this purpose, a method of forming a full color image by transferring each unicolor image onto a transfer sheet every time after forming a toner image to overlap unicolor images on the transfer sheet, and a method of forming a full color image by repeating a uniform charging operation, an exposure operation and a developing operation on a photoreceptor to transfer a full color image onto the transfer sheet at a time after overlapping a plurality of unicolor toner image on the photoreceptor, are available As for both methods mentioned above, image forming apparatus, equipped with a plurality of exposure-scanning units for performing the exposure operation, have been proposed to shorten the time required for forming a full color image. In one of such image forming apparatus, a plurality of units, such as chargers, the exposure-scanning systems, and the developing devices, are disposed in the periphery of the photoreceptor to form a full color image on the photoreceptor and to transfer it on the transfer sheet. In another one of such image forming apparatus, a plurality of photoreceptors are disposed in the periphery of a conveyance device for conveying the transfer sheet, and unicolor images, which are formed by means of a plurality of units, such as chargers, the exposure-scanning systems, and the developing devices, disposed opposite each of photoreceptors, are sequentially transferred onto the transfer sheet.

Incidentally, to form a full color image, it is necessary to perform exposure operations for three primary colors or four primary colors. For this purpose, it is also necessary to precisely adjust the exposure timing so that each unicolor image overlaps on the other unicolor images at the accurately same position, in such image forming apparatus.

The methods for controlling the exposure timing, in a manner as the above, are set forth in, for instance, Tokkaisho 62-266575 and Tokkaisho 62-295084. According to the method for the laser printer disclosed in Tokkaisho 62-266575, the exposure-scanning operation by the laser beam for every color starts when a counted value of clock signals reaches the predetermined set-value, and when the scanning start point deviates from the reference position, a deviation amount is detected and the predetermined set-value is changed, corresponding to the deviation amount. On the other hand, according to the method for the color copier disclosed in Tokkaisho 62-295084, the microprocessor controls the commencement timing of the exposure operation by counting a number of pulses having a predetermined period, while the interruption having a relatively long interval is activated until the time just before the generation of the timing signal, to relieve the workload of the microprocessor, and the interruption having a short interval of the timer set-value is activated once just before the generation of the timing signal, to precisely generate the timing signal.

In conventional color image forming apparatus, deviation amounts are detected in a manner as mentioned above, and the scanning start positions are changed, corresponding to the detected deviation amounts, to coincide positions of the unicolor images to each other. However, since the exposure-scanning operation for each of the unicolor images is performed under the independent control system, it has been difficult to eliminate positional deviations, even if the above-mentioned changing operation for the scanning start positions is performed, and therefore, it has been difficult to produce a high-quality color image due to occurrences of the color deviations.

SUMMARY OF THE INVENTION

To overcome the abovementioned drawbacks in conventional color image forming apparatus, it is an object of the present invention to provide a color image forming apparatus, which makes it possible to form a high-quality color image without generating any color deviations.

Accordingly, to overcome the cited shortcomings, the above-mentioned object of the present invention can be attained by the color image forming apparatus described as follows.

(1) A color image forming apparatus, comprising: a photoreceptor; a plurality of exposure-scanning sections, each of which performs an exposure-scanning operation onto the photoreceptor by means of a laser beam deflected by a polygon mirror and includes a horizontal-sync. signal generator to generate a horizontal-sync. signal synchronized with a rotational period of the polygon mirror, wherein one of the exposure-scanning sections outputs a reference horizontal-sync. signal; a synchronizing section to synchronize the horizontal-sync. signal, outputted by the other exposure-scanning section, with the reference horizontal-sync. signal, and to synchronize a image tip signal with the reference horizontal-sync. signal; an adjusting section to adjust a commencement of the exposure-scanning operation performed by each of the exposure-scanning sections, based on the reference horizontal-sync. signal outputted by one of the exposure-scanning sections; and a positional deviation detecting section to detect a positional deviation from a plurality of marks, formed on the photoreceptor by means of the exposure-scanning sections, in a state of synchronizing the horizontal-sync. signals each other and synchronizing the image tip signal with the reference horizontal-sync. signal.

(2) The color image forming apparatus of item 1, wherein the adjusting section adjusts a positional deviation in a unit of one scanning line by performing an adjustment between the horizontal-sync. signal and the image tip signal, and adjusts a positional deviation less than one scanning line by changing a phase of clock signals utilized for driving the polygon mirror, based on data of the positional deviation detected by the positional deviation detecting section.

(3) The color image forming apparatus of item 2, wherein a unit adjustment for changing the phase of the clock signals, utilized for driving the polygon mirror, is greater than an amount of jitters generated by the polygon mirror.

(4) The color image forming apparatus of item 3, wherein an adjusting amount for changing the phase of the clock signals, utilized for driving the polygon mirror, is in a range between zero and [(one scanning line/the unit adjustment)−1]×the unit adjustment.

(5) The color image forming apparatus of item 1, wherein each of the marks includes at least a line segment being in parallel to a main scanning direction of the laser beam.

(6) The color image forming apparatus of item 1, wherein the exposure-scanning sections are disposed opposite the photoreceptor.

(7) The color image forming apparatus of item 1, further comprising: a plurality of photoreceptors, serving as the photoreceptor, wherein each of the exposure-scanning sections is disposed opposite each of the photoreceptors.

BRIEF DESCRIPTION OF THE DRAWINGS

Other objects and advantages of the present invention will become apparent upon reading the following detailed description and upon reference to the drawings in which:

FIG. 8(a) shows relative relations between an exposure-scanning section and marks formed by the exposure-scanning section and output signals of sensors, while FIG. 8(b) shows a partially enlarged view of FIG. 8(a).

DETAILED DESCRIPTION OF THE PREFERRED EMBODIMENT

Figure 1:
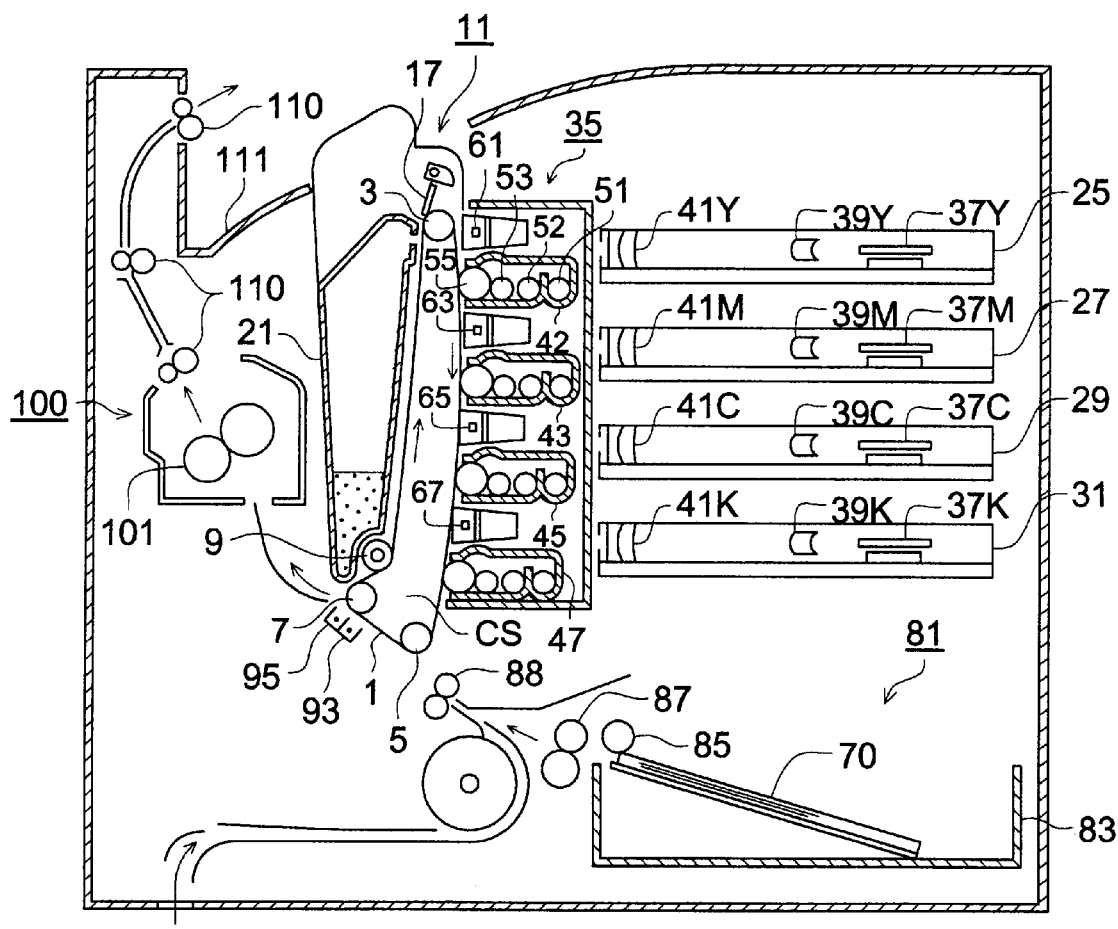
FIG. 1 shows a structure diagram of an image forming apparatus, embodied in the present invention.

FIG. 1 shows a structure diagram of an image forming apparatus, embodied in the present invention.

Figure 2:
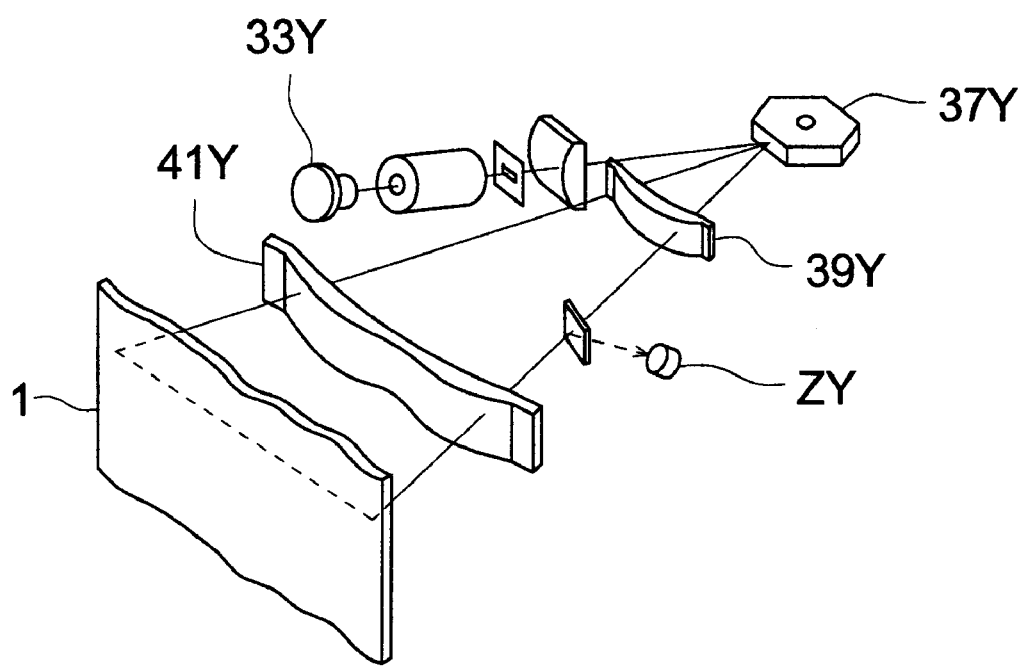
FIG. 2 shows a perspective view of a laser-scanning optical system in the image forming apparatus, embodied in the present invention.

FIG. 2 shows a perspective view of a laser-scanning optical system in the image forming apparatus, embodied in the present invention.

The image forming apparatus, embodied in the present invention, a multi-color (4 colors of (Y) yellow, (M) magenta, C (cyan) and K (black)) image forming apparatus.

In FIG. 1, belt-shaped image carrier (photoreceptor) 1 which is trained about upper roller 3, lower roller 5 and side roller 7 is spread vertically by the upper roller 3 and the lower roller 5, and is driven in the arrowed direction.

Further, on the surface which moves from the bottom to the top in the belt-shaped image carrier 1, there is provided pressure roller 9 serving as a guide means which presses the belt-shaped image carrier 1 toward closed space CS formed by the belt-shaped image carrier 1 and guides the belt-shaped image carrier 1 toward the closed space CS. On the upper portion of the surface in the belt-shaped image carrier 1 moving from the bottom to the top, there is provided cleaning means 11, which removes developing agents on the belt-shaped image carrier 1. Below the cleaning means 11, collecting box 21 serving as a collecting means which collects developing agents removed by the cleaning means 11 is provided along the belt-shaped image carrier 1.

The image forming apparatus in the present embodiment has therein four image forming means each being for each color, because it is a 4-color image forming apparatus. Namely, the image forming means are exposure-scanning section 25 which forms a latent image for Y (yellow) by the use of a laser beam for the belt-shaped image carrier 1, exposure-scanning section 27 which forms a latent image for M (magenta) by the use of a laser beam for the belt-shaped image carrier 1, exposure-scanning section 29 which forms a latent image for C (cyan) by the use of a laser beam for the belt-shaped image carrier 1, and exposure-scanning section 31 which forms a latent image for K (black) by the use of a laser beam for the belt-shaped image carrier 1.

Since structures of the exposure-scanning sections 25, 27, 29 and 31 serving as four optical writing sections are the same, the exposure-scanning section 25 is explained with reference to FIGS. 2, and explanations for other exposure-scanning sections will be omitted.

In these drawings, the numeral 33Y represents a laser beam source which emits a laser beam wherein image signals for Y (yellow) are superposed. A laser beam emitted from the laser beam source 33Y is reflected to be polarized by movement of a rotary surface of polygon mirror 37Y, and conducts scanning exposure for the photoreceptor surface of the belt-shaped image carrier 1 through fθ lens 39Y and cylindrical lens 41Y. Due to this scanning exposure, an electrostatic latent image is formed on the photoreceptor surface of the belt-shaped image carrier 1. Symbol ZY indicates a index sensor, which detects a commencement of laser beam scanning in the primary-scanning direction, and output a index signal, serving as a horizontal-synchronizing signal.

Next, as shown in FIG. 1, image forming cartridge 35 is provided detachably on the image forming apparatus. Inside the image forming cartridge 35, there are provided four developing means each developing an electrostatic latent image for each color formed on the belt-shaped image carrier 1. Namely, they are developing section 42 which develops a latent image formed by the exposure-scanning section 25, developing section 43 which develops a latent image formed by the exposure-scanning section 27, developing section 45 which develops a latent image formed by the exposure-scanning section 29, and developing section 47 which develops a latent image formed by the exposure-scanning section 31. Since structures of these four developing sections 42, 43, 45 and 47 are the same, the developing section 42 for color Y is explained, and explanations for other developing sections will be omitted.

The numerals 51 and 52 represent screws which stir and convey developing agents for color Y conveyed from an unillustrated developing agent reservoir section, and the numeral 53 is a supply roller which supplies developing agents to developing sleeve 55. The developing sleeve 55 carries developing agents, conducts reversal development for an electrostatic latent image on the belt-shaped image carrier 1, and forms toner images on the belt-shaped image carrier 1. Further, inside the image forming cartridge 35, there are provided charging electrodes for charging means which give electric charges to the belt-shaped image carrier 1. Namely, the charging electrodes are charging electrode 61 for color Y, charging electrode 63 for color M, charging electrode 65 for color C, and charging electrode 67 for color K.

On the other hand, in sheet-feeding section 81, there is provided cassette 83 housing therein transfer sheet 70. Transfer sheet 70 in the cassette 83 is fed out by conveyance roller 85, then nipped by paired conveyance rollers 87 and by paired timing rollers 88 to be conveyed, and is conveyed to the transfer/separation section.

In the transfer/separation section, there are provided transfer electrode 93 which transfers a toner image on the belt-shaped image carrier 1 onto transfer sheet 70 through corona discharge and separation electrode 95 which separates the transfer sheet 70 from the belt-shaped image carrier 1 through AC discharge.

In fixing section 100, sheet 70 is nipped by paired rollers 101 between a heat roller on one side and a pressure roller on the other side to be given heat and pressure so that the toner image is fused on the transfer sheet 70, and then, conveyed to sheet delivery tray 111 by paired conveyance rollers 110.

The forming process of a full color image, in the image forming apparatus constituted as mentioned above, will be described in the following.

Preceding to the exposing operation, belt-shaped image carrier 1 is charged by charging electrode 61, and then, an electrostatic latent image is formed on belt-shaped image carrier 1. Then, a toner image of color Y is developed on belt-shaped image carrier 1 by toner of color Y residing on developing sleeve 55 of developing section 42. The same operations as the foregoing are conducted for other colors, namely, for M, C and K, and toner images for Y, M, C and K are formed on the belt-shaped image carrier 1.

On the other hand, transfer sheet 70 is conveyed to transfer section 91 by means of pared conveyance rollers 85 and pared conveyance rollers 87. The transfer sheet 70 thus fed is adjusted in terms of timing by timing roller 88 so that the transfer sheet 70 may be synchronized with the toner image on the belt-shaped image carrier 1, and is conveyed to transfer section 91 where transfer electrode 93 in the transfer section 91 charges the transfer sheet 70 and thereby, toner images on the belt-shaped image carrier 1 are transferred onto the transfer sheet 70. Further, the transfer sheet 70 is separated from the belt-shaped image carrier 1 by neutralizing action of separation electrode 95.

Then, the transfer sheet 70 is heated and pressed at fixing section 100, whereby toner images are fused on the transfer sheet 70 which is then ejected by paired conveyance rollers 110 onto sheet delivery tray 111. Excessive toner, on the belt-shaped image carrier 1 on which the transferring has been finished, is removed by blade 17 of cleaning means 11, and is collected in collecting box 21.

As aforementioned, each of images of color Y, color M, color C and color K should be formed on belt-shaped image carrier 1 at the same position by means of exposure-scanning sections 25, 27, 29, 31, each of which corresponds to each color. In the embodiment of the present invention, the image positions of each color coincide each other by controlling the exposure-scanning sections as described in the following.

Figure 3:
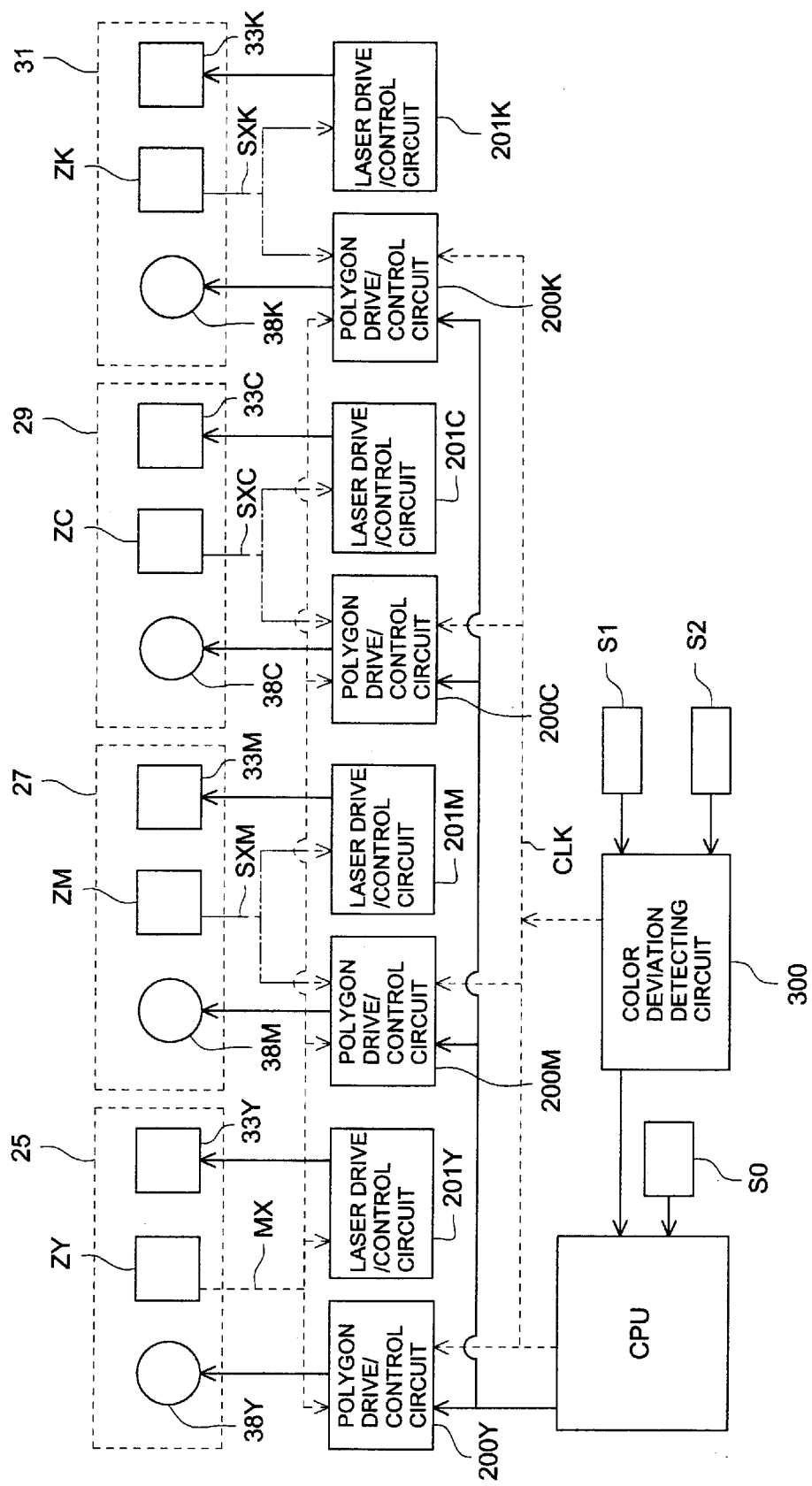
FIG. 3 shows a block diagram of the control system for exposure-scanning sections.

FIG. 3 shows a block diagram of the control system for exposure-scanning sections 25, 27, 29, 31.

Each of exposure-scanning sections comprises polygon motor 38Y, 38M, 38C or 38K for driving polygon 37Y, 37M, 37C or 37K, index sensor ZY, ZM, ZC or ZK shown in FIG. 2, and laser light source 33Y, 33M, 33C or 33K including a light emitting diode shown in FIG. 2, respectively. Polygon motors 38Y, 38M, 38C and 38K are DC servomotors, which are controllably driven by polygon-driving clock signals, to be described later.

For instance, when exposure-scanning section 25 for color Y is defined as a master unit for reference, master index signals MX, serving as horizontal synchronizing signals generated by index sensor ZY which serves as a horizontal synchronizing signal outputting means in exposure-scanning section 25 for color Y, are fed into polygon-driving control circuits 200Y, 200M, 200C, 200K, serving as a synchronizing means, and laser-driving control circuits 201Y, 201M, 201C, 201K. Further, slave index signals SXM, SXC, SXK outputted by index sensors ZM, ZC, ZK, serving as a horizontal synchronizing signal outputting means in exposure-scanning sections 27, 29, 31 other than exposure-scanning sections 25 as the master unit, are fed into polygon-driving control circuits 200M, 200C, 200K and laser-driving control circuits 201M, 201C, 201K, respectively. Clock signals CLK are inputted into polygon-driving control circuits 200Y, 200M, 200C, 200K from the CPU (Central Processing Unit) to generate polygon-driving clock signals by dividing clock signals CLK. Further, a phase difference between master index signal MX and each of slave index signals SXM, SXC, SXK is detected by counting clock signals CLK from the time when master index signal MX is inputted, to the time when each of slave index signals SXM, SXC, SXK is inputted. In addition, since polygon motors 38Y, 38M, 38C and 38K are coupled in a PLL (Phase Locked Loop) servo circuit with reference to the polygon-driving clock signals, a phase relation between the polygon-driving clock signals and the index signals is always kept in a constant value. Accordingly, the phase difference between master index signal MX and each of slave index signals SXM, SXC, SXK can be adjusted to an arbitral value by changing the phase of polygon-driving clock signals based on the detected data for the phase difference mentioned above.

When forming a full color image, each of exposure-scanning sections 25, 27, 29, 31 commences its exposure-scanning action so that the position of each color image coincides with those of other color images. Conventionally, the exposure-scanning action is commenced based on an image region signal generated by counting a predetermined number of index signals, which is equivalent to the distance between the exposure-scanning sections, from an image tip signal.

The conventional method, however, has been insufficient to adjust the color deviations, since the positional adjustment of color images is coarsely possible within a unit of one index signal, in other word, within a unit of one scanning line. To overcome the above drawback, the present invention allows the image forming apparatus to finely adjust the color deviations less than one scanning line by the method of adjusting phase differences between the index signals of exposure-scanning sections and shifting the scanning timing at a small amount, in addition to the conventional method.

Figure 4:
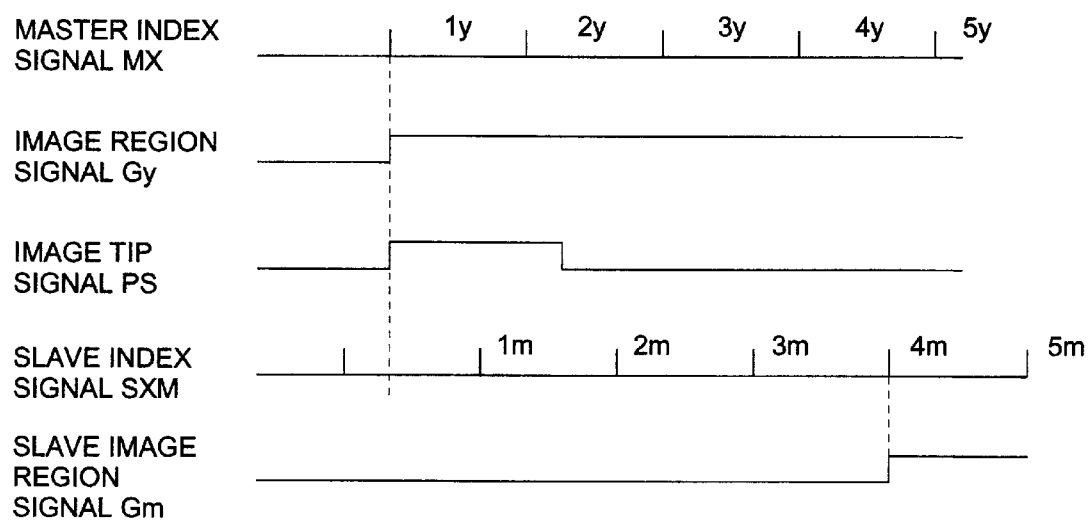
FIG. 4 shows a timing chart of various kinds of signals.
Figure 5:
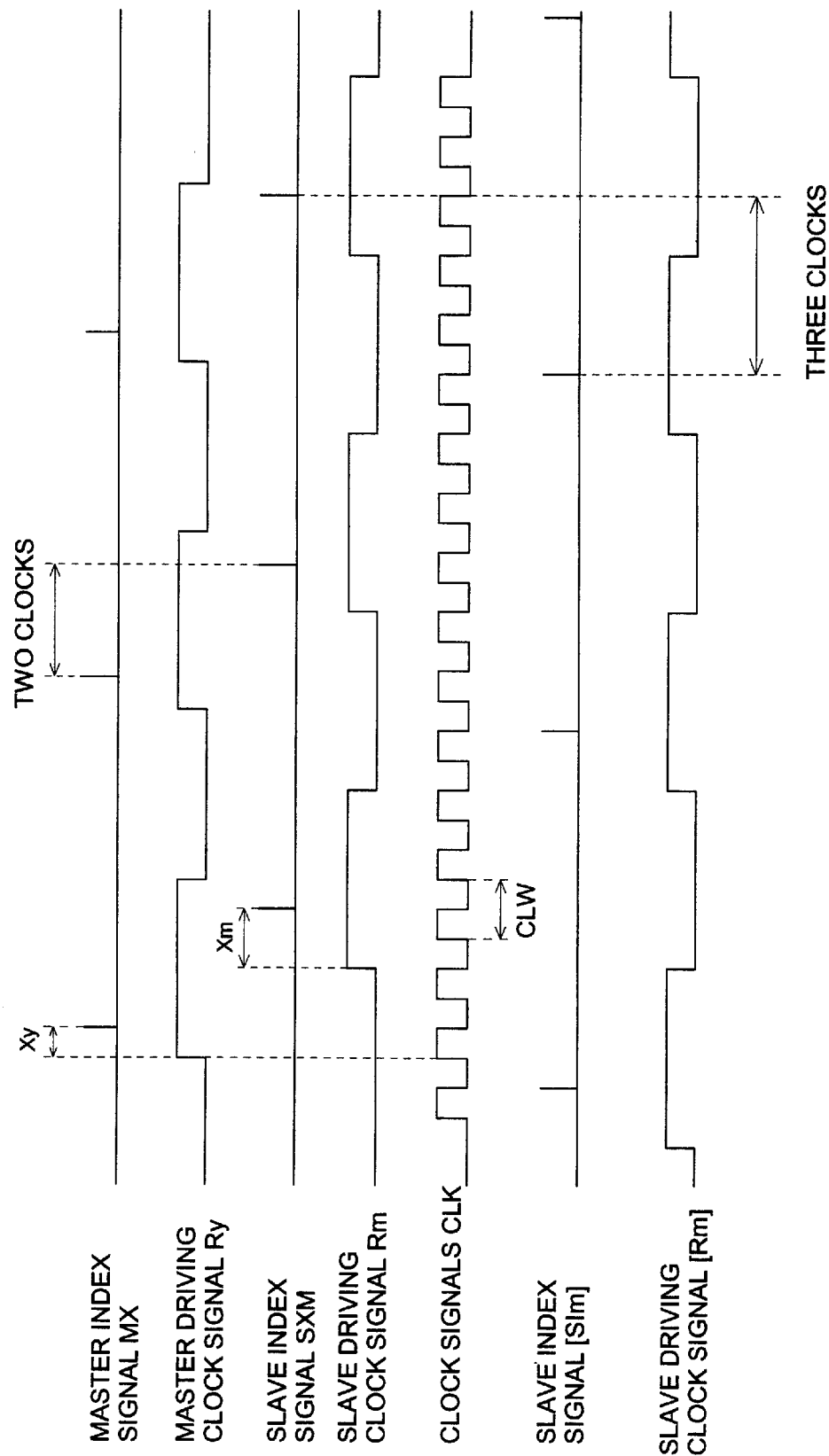
FIG. 5 shows a timing chart, which indicates relations between clock signals and other signals.

FIG. 4 shows a timing chart of various kinds of signals, and FIG. 5 shows a timing chart, which indicates relations between clock signals CLK and other signals.

The image forming operation is initially commenced at the time when image tip signal PS turns to the high status. For instance, image tip signal PS is generated from master index signal MX and a seam-detecting signal detected by sensor SO, which detects a seam position on the photoreceptor element, namely, image tip signal PS is generated for every colors Y, M, C, K, to determine the position of the image tip, so that the image is formed on an appropriate position, avoiding the seam position.

Further, image region signals Gy, Gm, Gc, Gk (only Gy, Gm are shown in FIG. 4), each of which indicates an image effective region of each color image, are outputted for every exposure-scanning sections 25, 27, 29, 31, and the exposure-scanning scanning action of each color is commenced on the bases of the image region signal concerned.

Image tip signal PS is once synchronized with master index signal MX, and then, the image region signal is generated by counting index signal, corresponding to each color, from low-to-high transition of image tip signal PS synchronized with master index signal MX.

The exposure-scanning action of color Y for belt-shaped image carrier 1 is commenced at the time of low-to-high transition of image tip signal PS, and master index signals 1y, 2y, 3y . . . are successively outputted to conduct one line exposure-scanning for every index signals. Among the exposure-scanning actions performed by other slave exposure-scanning sections 27, 29, 31, for instance, the exposure-scanning scaning action of color M is commenced at the time of low-to-high transition of image region signal Gm which is synchronized with the fourth slave index signal 4m, counting from the initial slave index signal 1m after the time of low-to-high-transition of image tip signal PS. The CPU, serving as an adjust-controlling means, determines what number of the slave index signal should be synchronized with the image region signal, based on the deviation amount to be described later. Thus, the color deviation can be adjusted by counting slave index signals from the time of low-to-high transition of image tip signal PS, and synchronizing the low-to-high transition of the image region signal with specific number of the slave index signal determined by the CPU.

On the other hand, the CPU also adjusts the color deviation less than one scanning line by changing the phase difference between the driving clock signals of polygon motor 38Y for color Y (to be described in the following) and that of each of polygon motors 38M, 38C, 38K for colors M, C, K. In the following, polygon motor 38Y is exemplified for explanation.

FIG. 5 shows a timing chart, indicating relations between clock signals CLK and other signals.

The conveyance of belt-shaped image carrier 1 and the rotation of each polygon are controlled on the basis of clock signals CLK indicated in FIG. 5, and specifically, polygon motors 38Y, 38M, 38C, 38K are driven by driving clock signals, which is generated by dividing clock signals CLK, for instance, by 6. As aforementioned, since the polygon motors are coupled in the PLL servo circuit with reference to the polygon-driving clock signals, time difference Xy between master index signal MX and low-to-high transition of master-driving clock signal Ry is always kept in a constant value for color Y. The time difference between the slave index signal and low-to-high transition of the slave-driving clock signal is always kept in a constant value for colors M, C, K, as well. For instance, time difference Xm is for color M.

When slave index signal SXM is de layed for 2 clock signals compared to master index signal MX, as shown in FIG. 5, the CPU determines that slave index signal SXM should be advanced by, for instance, 3 clock signals from the present state, and adjust the deviation in a unit of clock signals CLK, based on the detected amount of the deviation. Slave-driving driving clock signals Rm and slave index signals. SXM in the abovementioned case are shown in the lower lines of FIG. 5. Thus, it is possible to adjust the phase difference between the driving clock signals for driving the polygon of master exposure-scanning section 25 and that for driving the polygon of slave exposure-scanning section 27 in a unit of clock signals CLK, in order to adjust the deviation less than one scanning line for each color. However, since the rotation of the polygon includes jitter components, it is desirable that one cycle width CLW of clock signals CLK, which is a unit of phase adjustment as shown in FIG. 5, is greater than the amount of jitter fluctuations.

Further, when an adjustable amount within a one scanning line is set in a range from zero to maximum value N=one scanning line/adjustment unit, sometimes, the deviation more than one scanning line would occur depending on the influence of the jitter components. To avoid this, it is possible to always control stably, by setting the maximum value=(adjustment unit)×(N-1).

The deviation amounts for adjusting the synchronizing relations between master index signal MX and slave index signals SMX, SXC, SXK and driving clock signals Gm, Gc, Gk of polygon motors 38M, 38C, 38K can be obtained by detecting mark MK, which is formed on belt-shaped image carrier 1 in advance to detect the color deviations, by means of two sensors S1, S2, serving as detecting means, and color deviation detecting circuit 300.

Figure 6:
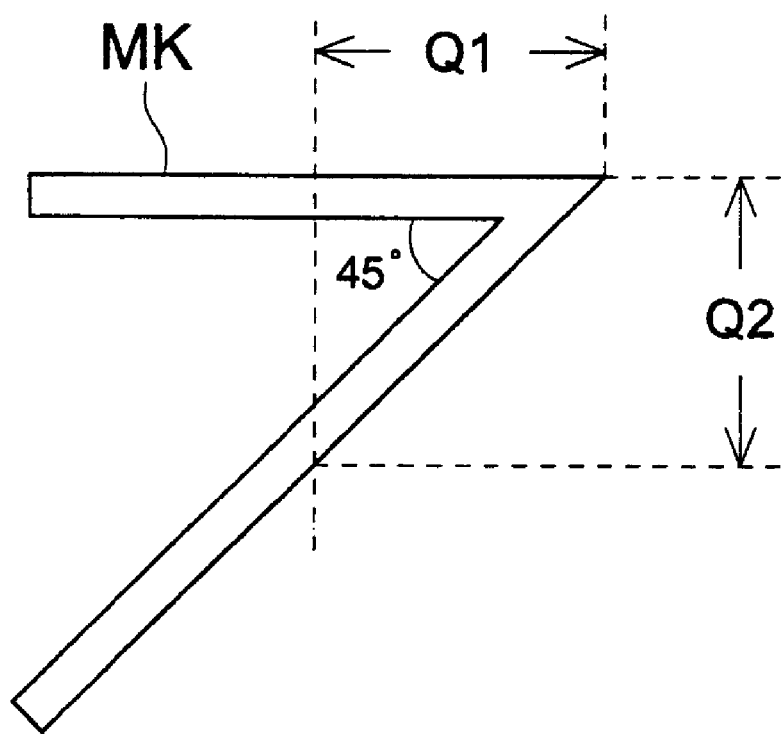
FIG. 6 shows a enlarged view of a mark.
Figure 7:
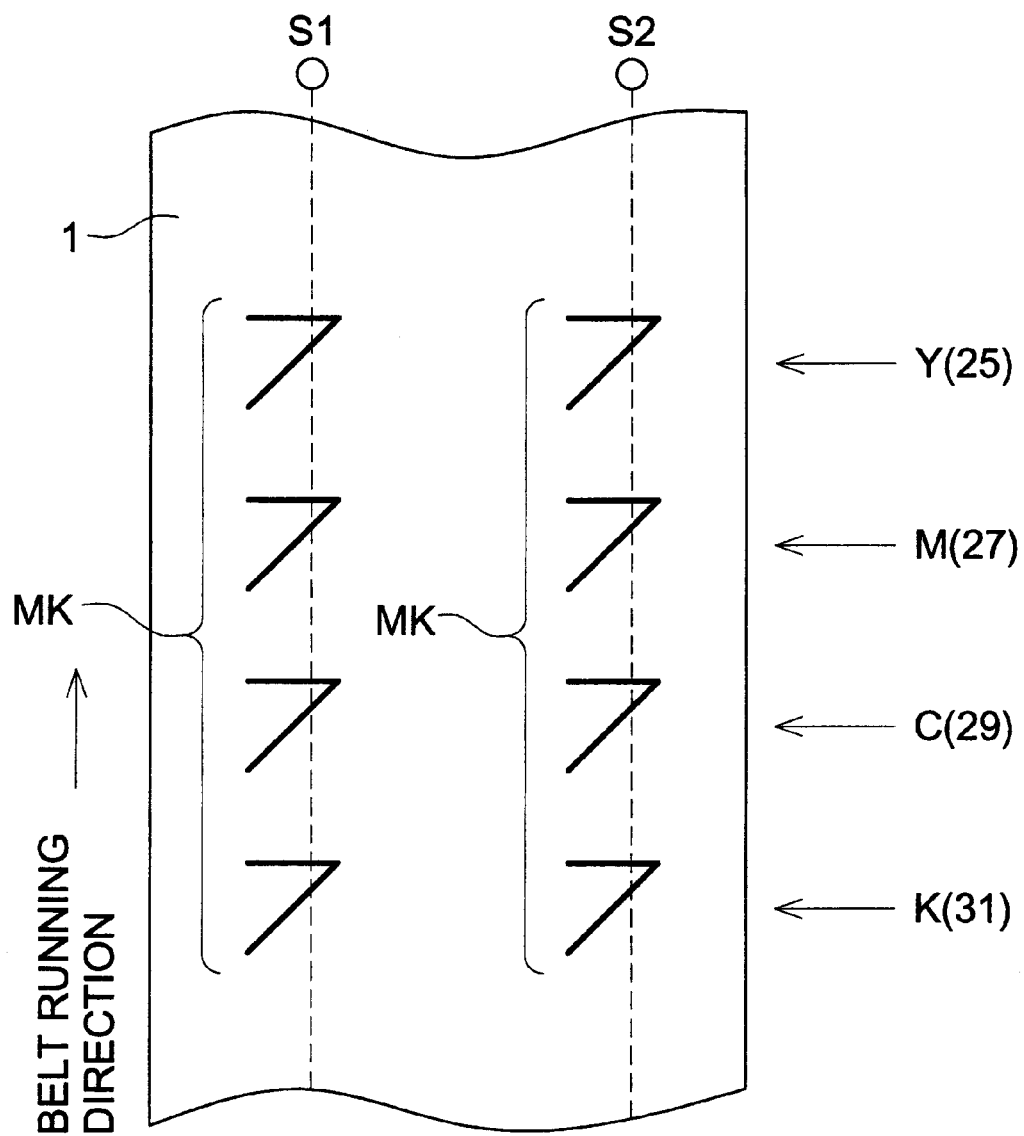
FIG. 7 shows a view of marks formed on a belt-shaped image carrier.
Figure 8:
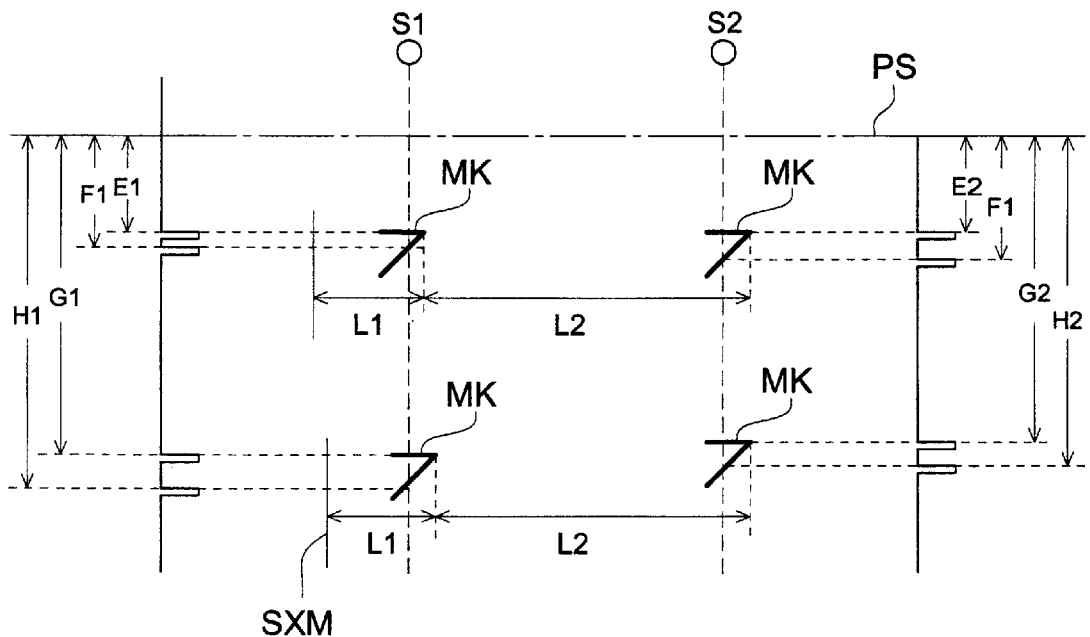
Figure 8:
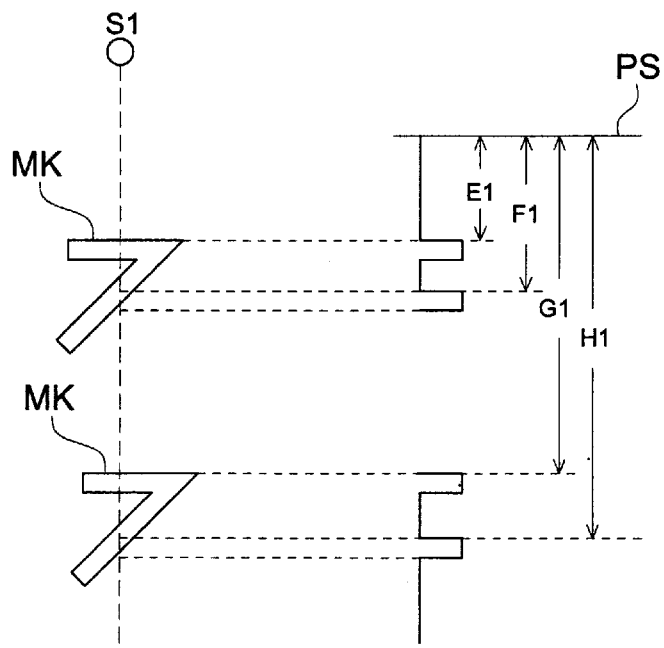

FIG. 6 shows a enlarged view of mark MK; FIG. 7 shows a view of marks MK formed on belt-shaped image carrier 1; FIG. 8(a) shows relative relations between exposure-scanning section 25 and marks MK formed by exposure-scanning section 27 and output signals of sensors S1, S2; and FIG. 8(b) shows a partially enlarged view of FIG. 8(a).

As shown in FIG. 6, marks MK, having a half-arrow shape in an angle of 45 degree, are formed on the scanning lines of sensors S1, S2. Accordingly, distance Q1 between the right edge of mark MK and the scanning line of the sensor is equal to distance Q2 between two intersections of mark MK and the scanning line of the sensor, namely Q1=Q2. Then, a pair of two marks MK, corresponding to each of colors Y, M, C, K, is simultaneously exposed on belt-shaped image carrier 1 by each of exposure-scanning sections 25, 27, 29, 31 and developed in each color. Namely, eight marks MK are simultaneously formed on belt-shaped image carrier 1 in a manner such that two marks MK, having a same color, are aligned in a direction orthogonal to the running direction of belt-shaped image carrier 1 on the scanning lines of sensors S1, S2 and four pairs of the two marks MK are aligned in the running direction of belt-shaped image carrier 1. Accordingly, positional data of mark MK are outputted by sensors S1, S2 during marks MK, formed on belt-shaped image carrier 1, pass the positions of sensors S1, S2. When forming marks MK, the master index signals and the slave index signals are controlled in a certain predetermined phase condition, for instance, desirably in such a condition that both phases coincides each other.

In FIG. 8(a), marks MK, formed by master exposure-scanning section 25 and slave exposure-scanning section 27 to be detected by sensor S1, are indicated in the vertical left row, and the pulse waveform of marks MK detected by sensor S1 is indicated at the further left side. In addition, marks MK of colors Y and M are indicated in the vertical right row as well, and the pulse waveform of marks MK detected by sensor S2 is indicated at the further right side. The relation between the pulse waveform and marks MK in the vertical right of row shown in FIG. 8(a) is exemplified in FIG. 8(b).

The positions of the pulses can be obtained by counting clock signals up to the high-to-low transition of the pulse detected by sensors S1, S2 with reference to image tip signal PS as aforementioned. For instance, a number of clocks counted up to the top edge of mark MK of color Y on the scanning line of sensor S1 is defined as E1; a number of clocks counted up to the intersection of the inclined line of mark MK of color Y and the scanning line of sensor S1 is defined as F1; a number of clocks counted up to the top edge of mark MK of color M is defined as G1; a number of clocks counted up to the intersection of the inclined line of mark MK of color M and the scanning line of sensor S1 is defined and H1; and those on the scanning line of sensor S2 are also defined as E2, F2, G2, H2, respectively. Further, the distance from each index signal to the rear end of mark MK and the distance between two marks MK, located on the right and left, are also determined as L1 dots (clocks) and L2 dots (clocks), respectively. It is possible to calculate each of deviation amounts of exposure positions of three slave exposure-scanning sections 27, 29, 31 versus that of master exposure-scanning section 25, to be described later, by using detected data mentioned above. When slave exposure-scanning sections 27, 29, 31 are inclined with reference to master exposure-scanning section 25, inclined amount J can be obtained by the following equation:

$$J=(G1-G2)-(e1-E2)$$

When slave exposure-scanning sections 27, 29, 31 are not inclined, J=0.

Main scanning magnification factor U can be calculated by the following equation.

$$U=[L2-\{(H2-G2)-(H1-G1)\}]/[L2-\{(F2-E2)-(F1-E1)\}]$$

When main scanning magnification factors U are coincided each other, U=1.

Main scanning start point V can be calculated by the following equation.

$$V=\{L1-(F1-E1)\}-\{L1-(H1-G1)\}/U$$

When main scanning start points V are coincided each other, V=0.

Sub scanning start point W can be calculated by the following equation.

$$W=G1-E1, \text{ or } G2-E2, \text{ or } \{(G1-E1)+(G2-E2)\}$$

The CPU adjusts the aforementioned relative timings and phases by using twelve data including inclined amounts J, main scanning magnification factors U, main scanning start points V and sub scanning start points W, which are calculated with respect to each of colors M, C, K, to form an full color image without any color deviation. Specifically, the CPU, serving as adjusting means, adjusts sub scanning start points W.

In the abovementioned adjustment, the CPU divides deviation amount Wx into component Wx1, which is integral multiple of one scanning line, and component Wx2, which is a fraction of it, namely the CPU performs a calculation of Wx=Wx1+Wx2. As aforementioned, when generating the effective image region signal, component Wx1 is utilized as the adjusting value for counted values of slave index signals SXM, SXC, SXK, and component Wx2 is utilized as the phase adjusting values of polygon driving clocks Rm, Rc, Rk, to adjust each of them.

According to the abovementioned adjustment with marks MK, it is possible to always form a full color image without any color deviations, since the CPU controls the image forming apparatus so as to automatically perform the abovementioned adjustment in advance to the image forming process, for instance, when the power source of the image forming apparatus is turned ON, when a predetermined time period has elapsed in the standby state of the image forming apparatus, or when environmental conditions, such as temperature, etc., vary.

Further, the embodiment of the present invention can be applied not only for the image forming apparatus having the belt-shaped image carrier mentioned above, but also for the image forming apparatus having a photoreceptor drum and equipped with a plurality of exposure-scanning sections and a plurality of developing sections in the periphery of the photoreceptor drum. Furthermore, the embodiment of the present invention can be applied for a color image forming apparatus having a plurality of photoreceptors, in which a toner image of each color is formed on each of photoreceptors and a full color image is formed on a transfer sheet by transferring each toner image onto the transfer sheet from each of photoreceptors.

According to the present invention, since the timing adjustments between the index signals can be achieved by synchronizing relative relations between the index signals at the start time of the exposure-scanning operation of the exposure-scanning sections, each of which forms each color image, and the deviation less than one scanning line can be also adjusted, it is possible to achieve the adjustment on the level of a very high precision. Thus, it is possible to position each image of primary colors so as to precisely coincide each other, resulting in the formation of a high-quality quality color image.

Further, according to the present invention, a high-quality color image can be formed without being influenced by the jitters of rotation of the polygon mirror.

Still further, according to the present invention, it becomes possible to precisely adjust the position of each color image in the sub-scanning direction, resulting in the formation of a high-quality color image.

Still further, according to the present invention, in an image forming apparatus in which a full color image, formed on the photoreceptor, is transferred onto a transfer sheet at a time, it is possible to form a high-quality color image.

Still further, according to the present invention, in an image forming apparatus having a plurality of photoreceptors, in which a toner image of each color is formed on each of photoreceptors and a full color image is formed on a transfer sheet by transferring each toner image onto the transfer sheet from each of photoreceptors, it is possible to form a high-quality color image.

What is claimed is:

1. A color image forming apparatus, comprising:

a photoreceptor;

a plurality of exposure-scanning sections, each of which performs an exposure-scanning operation onto said photoreceptor by means of a laser beam deflected by a polygon mirror, the plurality of exposure-scanning sections including a horizontal-sync signal generator to generate a horizontal-sync. signal synchronized with a rotational period of said polygon mirror, wherein one of said plurality of exposure-scanning sections outputs a reference horizontal-sync. signal;

a synchronizing section to synchronize said horizontal-sync. signal, output by said other exposure-scanning section, with said reference horizontal-type sync. signal, and to synchronize an image tip signal with said reference horizontal-sync. signal;

an adjusting section to adjust a commencement of said exposure-scanning operation performed by each of said plurality of exposure-scanning sections, based on said reference horizontal-sync. signal output by one of said plurality of exposure-scanning sections; and a positional deviation detecting section to detect a positional deviation on the basis of a plurality of marks formed on said photoreceptor by said plurality of exposure-scanning sections, said positional deviation detecting section detecting said positional deviation in such a state that said horizontal-sync. signals are synchronized with each other and said image tip signal is synchronized with said reference horizontal-sync. signal;

wherein said adjusting section adjusts said positional deviation in a unit of one scanning line by adjusting an interval between said horizontal-sync. signal and said image tip signal, and adjusts said positional deviation less than one scanning line by changing a phase of clock signals utilized for driving said polygon mirror, based on said positional deviation detected by said positional deviation detecting section; and wherein a unit adjustment for changing said phase of said clock signals, utilized for driving said polygon mirror, is greater than an amount of jitters generated by said polygon mirror.

2. The color image forming apparatus of claim 1, wherein an adjusting amount for changing said phase of said clock signals, utilized for driving said polygon mirror, is in a range between zero and [(one scanning line/said unit adjustment)−1]×said unit adjustment.

3. The color image forming apparatus of claim 1, wherein each of said plurality of marks includes at least a line segment in parallel with a main scanning direction of said laser beam.

4. The color image forming apparatus of claim 1, wherein said plurality of exposure-scanning sections are disposed opposite said photoreceptor.

* * * * *